United States Patent [19]

Carmichael

[11] 4,195,256
[45] Mar. 25, 1980

[54] ALTERNATOR WITH PARALLEL WINDINGS AND REGULATOR THEREFOR

[75] Inventor: Thomas F. Carmichael, Ortonville, Mich.

[73] Assignee: Syncro Corporation, Troy, Mich.

[21] Appl. No.: 845,360

[22] Filed: Oct. 25, 1977

[51] Int. Cl.² .............................................. H02J 7/14
[52] U.S. Cl. ........................................ 322/90; 320/59; 320/61; 320/DIG. 2
[58] Field of Search ............... 320/61, 59, 71, DIG. 2; 322/89, 90; 310/43

[56] References Cited

U.S. PATENT DOCUMENTS

| | | | |
|---|---|---|---|
| 2,900,591 | 8/1959 | Jacob | 322/90 X |
| 3,270,268 | 8/1966 | Carmichael et al. | 320/71 X |
| 3,784,894 | 1/1974 | Silvertown | 322/90 X |
| 3,857,082 | 12/1974 | Van Opijnen | 320/59 X |
| 3,971,977 | 7/1976 | Hirt et al. | 322/90 X |
| 3,974,406 | 8/1976 | Wehde | 310/43 X |

OTHER PUBLICATIONS

"Electric Machinery", Fitzgerald et al., McGraw-Hill Book Co., 1952, p. 131.

*Primary Examiner*—Robert J. Hickey
*Attorney, Agent, or Firm*—Harness, Dickey & Pierce

[57] ABSTRACT

Alternators are disclosed having plural sets of windings connected in parallel to reduce the cross section of the winding wire for a given output current level. The reduction in the cross section of the wire facilitates winding of the wire, and is believed to provide a more efficient alternator structure. Various shunt-type regulators are disclosed in combination with alternators having plural sets of windings which incorporate means for reducing the current through the shunt regulating circuit to reduce the current rating requirements of the regulating circuit switching elements.

9 Claims, 7 Drawing Figures

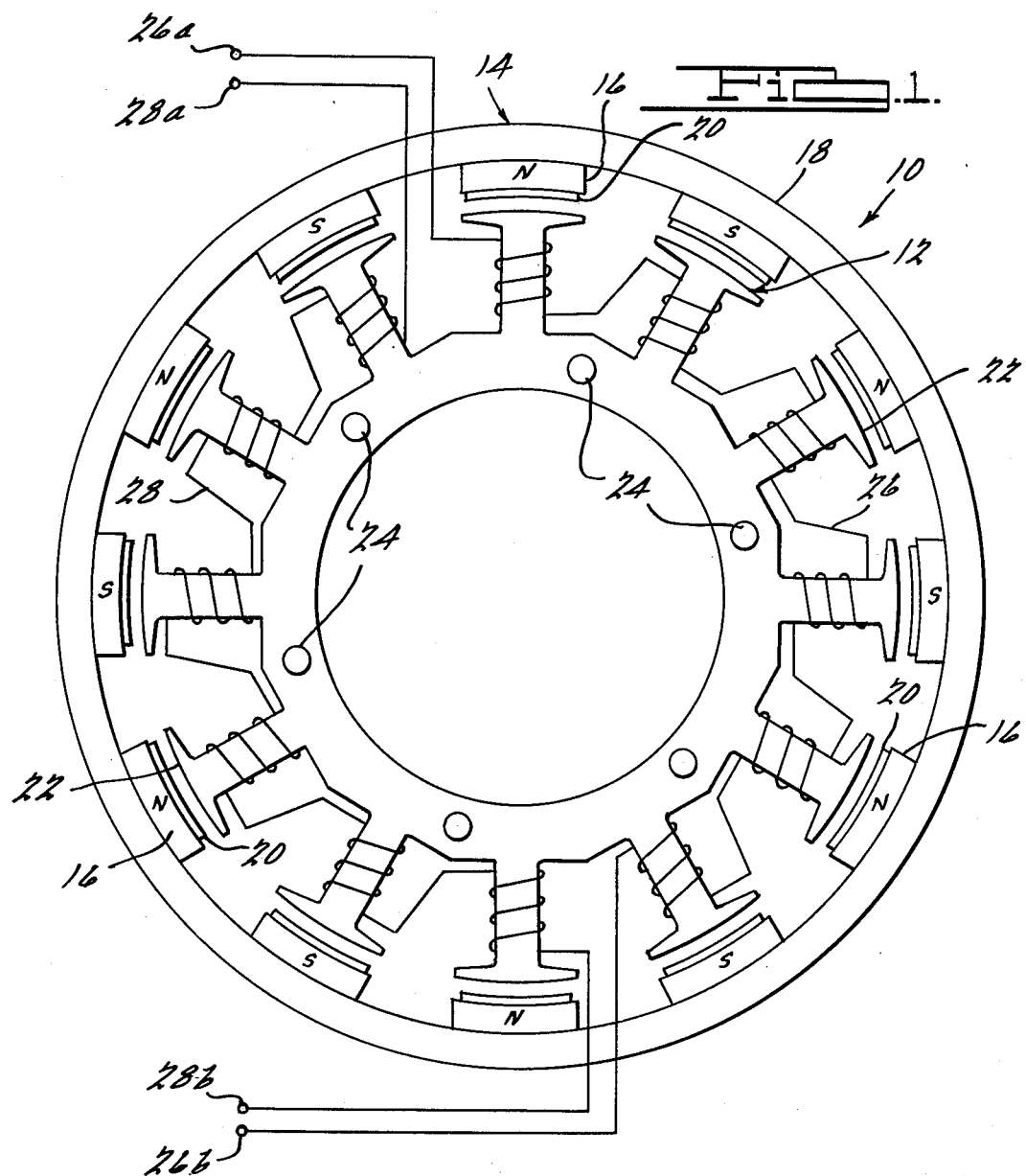

ALTERNATOR WITH PARALLEL WINDINGS AND REGULATOR THEREFOR

BACKGROUND AND SUMMARY OF THE INVENTION

The present invention relates to alternators and regulators therefor, and especially, compact and efficient high output alternators and shunt regulators for such alternators which may use relatively low current rating switching devices.

In recent years, the demand for permanent magnet alternators which produce relatively high output currents has been increasing. Ordinarily, the output current of an alternator can be increased by increasing the size of the alternator, and especially, the cross sectional area of the wire or conductor which forms the windings of the alternator. Unfortunately, increasing the cross sectional area of the conductor which forms the windings has drawbacks. Firstly, as conductor size increases, the wire is more difficult to wind on the stator structure of the alternator, and particularly, the forces which must be exerted on the conductor during winding increases as conductor size increases. Furthermore, the resulting winding is not as compact or as efficient as a winding with a smaller conductor size. This is principally due to the fact that the space between the conductors on the stator structure increases in cross sectional area as the conductor size increases.

An ancillary problem associated with the increase in output of the alternator is the problem of regulation of the alternator output. A now widely used form of regulation of permanent magnet alternators is disclosed in the U.S. patent to Carmichael et al, No. 3,270,268, issued Aug. 30, 1966. According to the teachings of that patent, the output of the permanent magnet alternator is shunted on at least one half cycle of the output waveform so as to effectively reduce the battery charging current to near zero. On the opposite half cycle, the field created by the shunt current collapses to produce a magnetic flux in opposition to the permanent magnet flux tending to reduce the output of the alternator on the opposite half cycle. The aforementioned patent to Carmichael et al also teaches means for reducing the current through the shunt switching element during shunt regulation of the alternator in the form of a regulating winding which may be connected in series with output or load winding of the alternator during shunt regulation of the alternator.

The regulator of this invention also shunts the output of the alternator to regulate the alternator. However, novel means are disclosed for reducing the current through the switching element of the shunt regulator without the use of a regulating winding. This aspect of the present invention is particularly important where there is insufficient room on the stator structure for a regulating winding, or where a compact stator structure is desired.

The alternator of the present invention has a plurality of sets of windings which are connected in parallel for increasing the output current of the alternator without a corresponding increase in conductor size. For example, a twelve pole stator may have two sets of six windings or four sets of three windings, with each set being on respective sequential poles. As a further example, an eighteen pole stator may have three sets of six windings, again with the sets being on respective sequential poles.

In order to achieve the desired output voltages and currents of the alternator, the wire size or cross sectional area is selected to be one-half that normally used to provide the given output current, but the number of turns is doubled to account for the fact that the set is on one-half the number of poles. If four sets are used, the wire size is selected to be one-quarter that normally used, but the number of turns are quadrupled, again so as to compensate for the fact that each set is on a reduced number of poles. Hence, the winding wire size is reduced by a factor equal to the number of sets, and the number of turns is increased by a factor equal to the number of sets. Preferably, each set is wound on a like number of poles, e.g., the stator is divided into a plurality of equal segments of a like number of poles with each winding set being wound on a respective segment of the stator.

On actual experimentation, it has been found that the output current levels are actually increased relative to an alternator having one set of windings of full wire size and normal complement of turns. This increase in output current levels is believed to be attributable to the greater efficiency obtained by virtue of the closer coupling of the smaller wire to the stator pole structure. Other factors may also contribute to the increase output current levels which are not known at the present time to applicant.

The present invention also provides regulators which are especially suited for use with the high output alternators of this invention, and particularly, shunting-type regulators which provide relatively modest current levels through the shunt switching devices without the use of regulating windings. In a first embodiment, the battery is placed in opposition to the windings of the alternator on one half cycle of the output waveform to reduce the output current of the alternator and to reduce the regulating current of a shunt regulator on the other half cycle. In a second embodiment, each of the output windings are regulated using shunt regulators. The shunt regulators are connected so as to individually regulate the output windings and also shunt the output windings in a series connected mode. The individual and series regulation of the output windings is cooperative so that each switching element of the regulators carries one-half of the output current of the alternator. In still another embodiment, the battery is discharged through a series connection of the normally-parallel output windings. The output windings are further connected in series in shunt regulation of the output windings and a single one of the output windings is also individually shunt regulated. The cooperation of the various modes of regulation of the output windings reduces the current through the regulator switching elements.

Other features of the present invention will be apparent in view of the following detailed description of the preferred embodiments.

BRIEF DESCRIPTION OF THE DRAWINGS

FIG. 1 is a view of an alternator of this invention including the stator and the permanent magnet rotor thereof;

FIG. 2 is a schematic diagram of a first embodiment of an alternator and regulator according to the present invention;

DETAILED DESCRIPTION OF THE PREFERRED EMBODIMENTS

Figure 3:
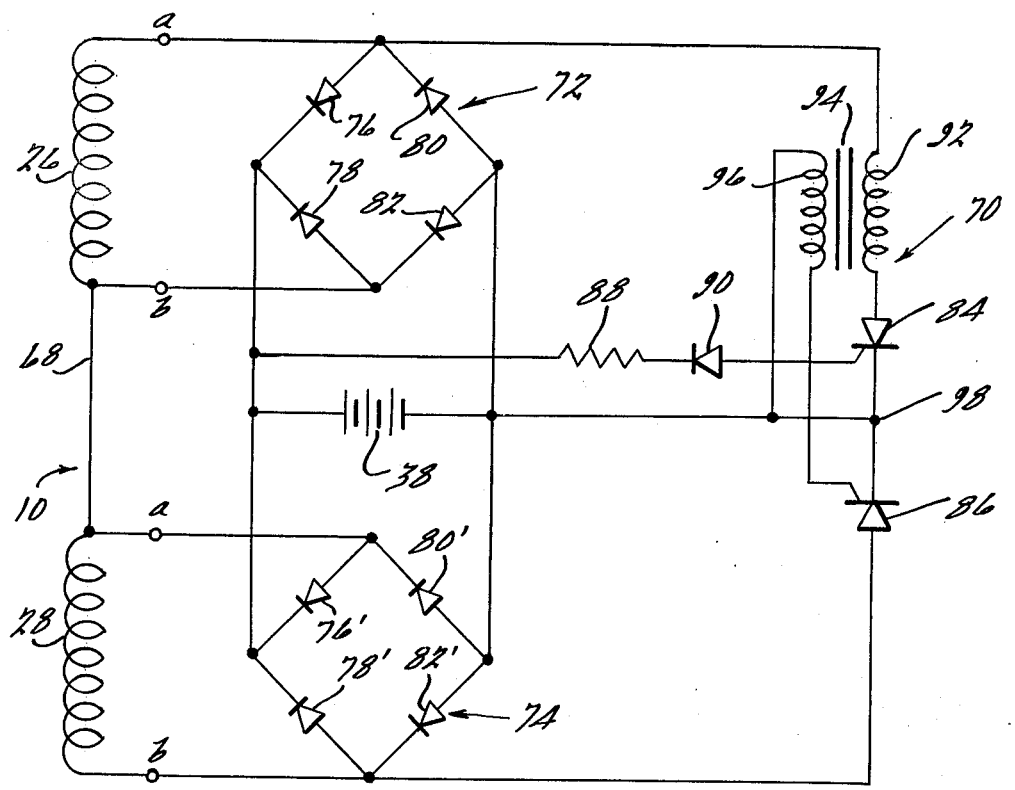
FIG. 3 is a schematic diagram of a second embodiment of an alternator and regulator according to the present invention.

In FIG. 1, an alternator 10 according to the present invention is illustrated. The alternator 10 has a stator structure shown generally at 12 and a rotor structure shown generally at 14. The rotor 14 is a permanent magnet type and comprises a plurality of permanent magnets 16, each having a north and south pole radially oriented with respect to the rotor and the stator. The permanent magnets are preferably made of a ferrite or ceramic magnet material such as barium ferrite. The permanent magnets 16 are affixed to a rotor housing or shell 18, for example, by gluing or other attachment structure. In particular, the permanent magnets 16 are arranged about the inner circumference of the shell 18 so that the magnetic poles facing the stator 12 alternate in polarity, as illustrated in FIG. 1. Optionally, the permanent magnets 16 may be provided with shoes 20 which tend to concentrate the flux of the permanent magnets 16 and protect the relatively soft material of the permanent magnets 16. The stator 12 is disposed radially inwardly of the rotor 14, and hence, the alternator of this exemplary embodiment may be termed an "inside-outside" alternator. It will be understood that the opposite configuration, i.e., the stator outside of the rotor, may also be used with the principles of the present invention, and so used, forms part of this invention. The stator 12 comprises a plurality of stacked laminations 22 of ferrous material such as steel or iron and may be secured in such stacked arrangement by rivets 24. In applications where low starting torque is desirable, the stator core 22 may be constructed of non-magnetic or non-ferrous materials such as wood or plastic. Two such applications are for alternators driven by sterling-cycle engines or alternators driven by wind apparatus such as propellers or vanes.

In this exemplary embodiment, the stator 12 has twelve poles and two windings 26 and 28. The winding 26 is wound in one direction, i.e., clockwise or counter-clockwise about each of six sequential poles of the stator core 22. The winding 28 is wound in the same direction about six mutually-exclusive sequential poles of the stator core 22. The winding 26 has output conductors 26a and 26b while the winding 28 has output conductors 28a and 28b.

Conventionally, permanent magnet alternators have a single winding wound about all of the poles of the stator. For alternators of higher current output, the size of the conductor which forms this winding increases. In the alternator of this invention, a wire or conductor size for windings 26 and 28 is selected to be one-half the cross sectional area of the conductor size of a single winding alternator but twice as many turns per pole than a single winding alternator of the same predicted current output. The two windings 26 and 28 are connected in parallel. It would be expected that alternator 10 having the two windings of one-half the conductor size and twice the number of turns per pole would have the same current output as a conventional alternator using a single winding of twice the conductor size and one-half the number of turns per pole than the alternator 10. However, on actual experimentation, it has been discovered that the output of the alternator 10 of this invention is significantly higher than the conventional alternator as described above. Although applicant is uncertain as to the exact reasons for the increase in alternator output, it is theorized that the smaller conductor size provides closer coupling to the stator poles yielding better efficiency. This invention provides the further advantage that smaller conductor size can be more readily wound since winding torques and forces are substantially reduced due to the smaller conductor size.

This invention is not limited to alternators having two sets of windings nor alternators having twelve stator poles. For example, similar advantages may be obtained by connecting four sets of windings on three consecutive mutually-exclusive poles of a twelve pole stator with each conductor having one-fourth the cross sectional area of a conductor of a conventional single winding alternator but each pole has four times the number of turns as the conventional single winding alternator. As a further example, an eighteen pole alternator may be constructed having three sets of windings on six consecutive mutually-exclusive poles with one-third the conductor cross sectional area as a conventional eighteen pole single winding alternator and three times the number of turns as a conventional eighteen pole single winding alternator. Other combinations are also possible following the rule that the cross sectional area of the wire is reduced by a factor equal to the number of sets of windings and the number of windings per pole is increased by a factor equal to the number of sets of windings.

With reference now to FIG. 2, an exemplary embodiment of an alternator of this invention is shown in a schematic fashion in combination with a first embodiment of a regulator of this invention. In FIG. 2, the windings 26 and 28 are shown connected in parallel at terminals a and b, i.e., by connecting conductor 26a to conductor 28a at terminal a and connecting conductor 26b and conductor 28b at terminal b. Terminals a and b are connected to a full wave rectifier 30 and an output regulator 32. The full wave rectifier 30 consists of diodes 34 and 36 which are connected to deliver the positive half waves of the alternator output waveform to the positive terminal of a battery 38 and diodes 40 and 42 which are connected to deliver the negative half waves of the alternator output waveform to the negative terminal of battery 38. As seen in FIG. 2, the diodes are connected in a bridge circuit which includes terminal 44 which is connected to terminal a of the alternator windings, terminal 46 which is connected to terminal b of the alternator windings, terminal 48 which is connected to the positive terminal of the battery 38, and terminal 50 which is connected to the negative terminal of the battery 38.

The rectifier 32 includes a master silicon controlled rectifier (silicon controlled rectifier is hereinafter "SCR") 52 and a slave SCR 54. The SCRs 52 and 54 have conventional anode, cathode and gate electrodes. The gate of the master SCR 52 is connected to the positive terminal of the battery 38 via a resistor 56 and a zener diode 58. The cathode of the SCR 52 is connected to the negative terminal of the battery 38 so that the SCR 52 is responsive to the voltage or charge level of the battery 38. The value of the zener diode 58 is selected so that the zener diode 58 conducts to gate the SCR 52 when the battery 38 attains a voltage representative of full charge on the battery 38.

The gate of the slave SCR 54 is connected to one coil 60 of a pulse transformer 62. The other coil 64 of the pulse transformer 62 is connected in series with the anode of the master SCR 52. The coils 60 and 64 of the pulse transformer 62 are wound so that the positive pulse is provided to the gate of the slave SCR 54 when the master SCR 52 turns off. The positive pulse from the pulse transformer 62 is effective to fire the slave SCR 54, and thus, the slave SCR 54 is fired when the master SCR 52 turns off.

The anode of the master SCR 52 is connected to the alternator output terminal a through the coil 64 of the pulse transformer 62. In this regard, the coil 64 of the pulse transformer 62 is wound of coil of few turns heavy gauge conductor so that its impedance is minimal. The cathode of the master SCR 52 is connected through terminal 50, diode 42 and terminal 46 to terminal b of the alternator output windings, via a connection or terminal 66. Consequently, when the master SCR 52 conducts, a relatively low impedance path is inserted across output terminals a and b of windings 26 and 28 of the alternator 10.

The anode of slave SCR 54 is connected to the positive terminal of the battery 38. The cathode of SCR 54 is connected to output terminal b of the windings 26 and 28 of the alternator 10. Consequently, when the slave SCR 54 fires, the positive terminal of battery 38 is connected to output terminal b of the windings 26 and 28.

In the operation of the alternator 10 and regulator 32 of FIG. 2, once the battery 38 has attained a voltage indicative of full charge, the zener diode 58 breaks down or avalanches to fire the master SCR 52. On the first half cycle in which terminal a is positive and terminal b is negative, the master SCR 52 carries the full output current of the windings 26 and 28. At the beginning of the next half cycle, as terminal b first becomes positive and terminal a becomes negative, master SCR 52 turns off thereby firing slave SCR 54. The conduction of slave SCR 54 causes the positive potential of the battery 38 to oppose the rising positive potential at output terminal b. Note that the negative terminal of the battery is held near the potential of output terminal a by diode 40 once the output terminal a begins to go negative. Consequently, the battery is effectively placed across the alternator windings 26 and 28 when the slave SCR 54 fires. Slave SCR 54 continues to conduct so long as the potential at output terminal b does not exceed the positive potential of the battery 38. When the potential at terminal b exceeds the positive battery potential, since the pulse transformer 62 is dissipated so that there is no further trigger signal for the slave SCR 54, slave SCR 54 is turned off and remains off for the remainder of the cycle.

The principle of regulation of the regulator 32 of FIG. 2 is as follows. On the half cycles in which output terminal a is positive, the output current of the windings 26 and 28 is shunted away from the battery 38 by the master SCR 52. This not only prevents the battery 38 from being charged, but also establishes a strong field associated with the windings 26 and 28 due to the shunt current which collapses to suppress the output of the alternator 10 on the next half cycle. The output of the alternator 10 is further suppressed on the next half cycle by the opposition of the battery potential to the then positive terminal b which opposes the current from terminal b thereby suppressing the current rise in the windings 26 and 28 in the direction of terminal a to terminal b. Of course, this opposition reduces battery charging during the opposite half cycle in which the output terminal b is not more positive than the battery. Hereinafter, the above described regulation on the opposite half cycle in which the battery opposes the windings is called battery opposition regulation.

Note that regulation is occurring on each half cycle. Furthermore, the shunt regulation on the one half cycle provides an effect benefitting the battery opposition regulation on the opposite half cycle so that the two methods of regulation provide a cooperative result. Of very great practical importance is the fact that, by virtue of this cooperation, the SCRs 52 and 54 may have a lower current rating than otherwise required. In this regard, although the master SCR 52 receives substantially the full output current of the alternator 10 on the first half cycle, on subsequent half cycles of regulation, the current through the master SCR 52 is substantially reduced so that the master SCR 52 may have a rating more representative of the average current therethrough, rather than the peak current on the first half cycle of regulation. It will be appreciated by those skilled in this art that SCRs of higher current rating have disproportionately higher cost, or conversely, the reduction of the current rating of the SCR by virtue of this invention provides a more than proportionate cost savings. Although regulating windings would also reduce the current rating requirements of the SCRs, it will be appreciated that alternators often have space limitations so that the addition of a regulating winding is not feasible.

Optionally, the regulator of FIG. 2 can be constructed so that the SCRs 52 and 54 fire at the same time. This is accomplished by winding the pulse transformer 62 such that a trigger pulse is provided to the gate of the slave SCR 54 when the master SCR 52 fires. With this construction, SCRs 52 and 54 are connected in parallel across windings 26 and 28 so that each bears one-half of the regulating current. More particularly, when the SCRs 52 and 54 fire, the windings 26 and 28 are connected through master SCR 52 via terminal a, winding 64 of pulse transformer 62, diode 42, and terminal b, and are connected through slave SCR 54 via terminal a, diode 34, and terminal b.

In FIG. 3, yet another embodiment of the present invention is shown. In FIG. 3, the windings 26 and 28 of the alternator 10 are illustrated. In the embodiment of FIG. 3, the windings 26 and 28 are connected in series via a conductor 68. The embodiment of FIG. 3 uses a regulator 70 of differing construction as well as a pair of full wave rectifying bridges 72 and 74 as compared to the single full wave rectifying bridge used in the embodiment of FIG. 2.

The first full wave rectifying bridge 72 includes diodes 76 and 78 which are connected to deliver positive half waves at terminals a and b, respectively, of winding 26 to the positive terminal of battery 38 and diodes 80 and 82 which are connected to deliver negative half waves at terminals a and b, respectively, of winding 26 to the negative terminal of battery 38. Diode bridge 74 is similarly connected and has diodes 76'–82' with like numbers providing like functions. The regulator 70 includes a master SCR 84 and a slave SCR 86. The gate of the master SCR 84 is connected to the positive terminal of the battery 38 via a resistor 88 and zener diode 90.

The anode of master SCR 84 is connected to output terminal a of winding 26 via a low impedance winding 92 of a pulse transformer 94. The cathode of master SCR 84 is connected to the negative terminal of the battery 38. The gate of slave SCR 86 is connected to the other coil 96 of the pulse transformer 94 so as to be fired when the master SCR 84 turns off. The anode of slave SCR 86 is connected to output terminal b of winding 28 while the cathode of slave SCR 86 is connected to the negative terminal of battery 38.

In the operation of the regulator 70 of FIG. 3, once voltage of battery 38 attains a level indicative of full battery charge, the zener diode conducts to fire the master SCR 84. When the master SCR 84 conducts, the master SCR 84 provides a low impedance path for both the winding 26 and the series connection of the windings 26 and 28 to thereby shunt both the winding 26 individually and the series connection of windings 26 and 28. More particularly, when the master SCR 84 conducts, the winding 26 is shunted through the master SCR 84 via terminal a, coil 92, master SCR 84, terminal 98, diode 82 and terminal b of winding 26. The windings 26 and 28, as connected in series by conductor 68, are shunted through the master SCR 84 via terminal a of winding 26, coil 92, master SCR 84, terminal 98, diode 82' and terminal b of winding 28. Consequently, although windings 26 and 28 are connected in parallel to the battery 38 for charging the battery, they are connected in series through the master SCR 84 for regulation thereof. The series connection tends to reduce the current through the SCR as compared to a connection whereby both windings 26 and 28 were connected in parallel across master SCR 84 so as to reduce the current rating requirement for the master SCR 84. Note that upon shunting of the winding 26 and the series windings 26 and 28 through a low impedance path, the battery 38 is effectively deprived of charging current and a strong field is created which collapses to reduce both charging current and regulating current on the opposite half cycle.

At the inception of the opposite half cycle, master SCR 84 turns off to fire slave SCR 86. Slave SCR 86 provides a low impedance path for the individual winding 28 and the series connection windings 28 and 26 via line 68. More particularly, on the opposite half cycle when output terminals b of windings 26 and 28 is positive, the conducting slave SCR 86 provides a shunt path for winding 28 from output terminal b of winding 28 through slave SCR 86, terminal 98, diode 80', and output terminal a of winding 28. Additionally, slave SCR 86 provides a shunt path for windings 26 and 28, as is connected in series by conductor 68, through output terminal b of winding 28, slave SCR 86, terminal 98, diode 80, and output terminal a of winding 26. The shunt paths through slave SCR 86 operate in a manner similar to the shunt paths through master SCR 84 on the opposite half cycle to further and cooperatively regulate the current to battery 38. Note that the same advantage of a reduction of current rating requirement for the slave SCR 86 is attained. Furthermore, the firing of either the master SCR 84 or the slave SCR 86 reduces the regulating current through the other SCR 84 or 86 on the next half cycle due to the collapsing shunt field.

Figure 4:
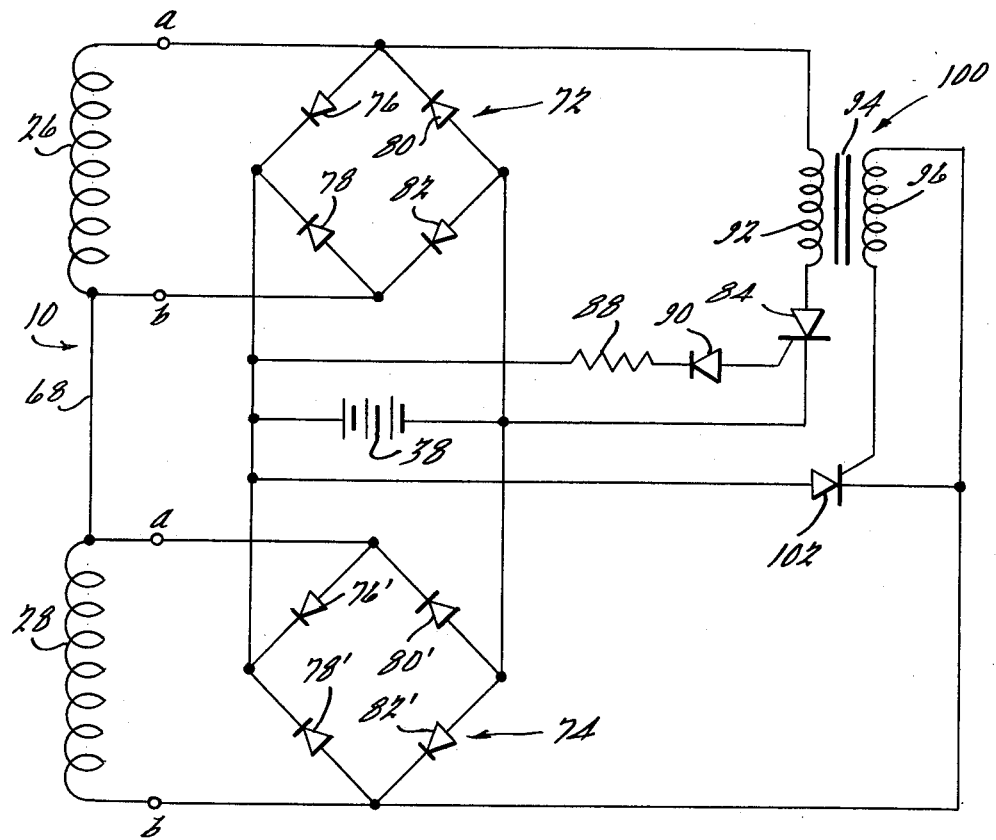
FIG. 4 is a schematic diagram of a third embodiment of an alternator and regulator according to the present invention.

In FIG. 4, an alternator 10 is illustrated with windings connected in series by conductor 68 as shown in FIG. 4. Additionally, the alternator 10 of FIG. 4 utilizes paralleled full wave rectifier bridges 72 and 74 for charging battery 38 as illustrated and described with respect to FIG. 4. However, the alternator 10 of FIG. 4 utilizes a regulator 100 of somewhat different configuration and operation. The master SCR portion of the regulator 100 of FIG. 4 is essentially the same as the master SCR portion of the regulator 70 of FIG. 3. In this regard, the master SCR portion of the regulator 100 includes a master SCR 84 connected between output terminal a of winding 26 and the negative terminal of battery 38. Its gate terminal is connected to sense battery voltage through a resistor 88 and zener diode 90. Furthermore, the low impedance winding 92 of a pulse transformer 94 is connected in series with the anode of the master SCR 84. The other coil 96 of the pulse transformer 94 is wound and is connected to the gate of a slave SCR 102 in a fashion to fire slave SCR 102 when the master SCR 84 turns on. Note that in the embodiment of FIG. 3, the slave SCR 86 was fired when the master SCR 84 turned off, whereas in the embodiment of 100 of FIG. 4, the slave SCR 102 is fired when the master SCR 84 is fired.

The slave SCR 102 has its anode connected to the positive terminal of the battery 38. The cathode of the slave SCR 102 is connected to output terminal b of winding 28.

In the operation of the alternator 10 and regulator 100 of FIG. 4, when the battery 38 attains a voltage level thereacross indicative of full charge, the zener diode 90 breaks down to fire the master SCR 84. When the master SCR 84 fires, a low impedance path is placed across the winding 26 via output terminal a of winding 26, the low impedance coil 92 of pulse transformer 94, the master SCR 84, the negative terminal of battery 38, the diode 82, and the output terminal b of winding 26. The windings 26 and 28, as connected in series by conductor 68, are also shunted through a low impedance path through the output terminal a of winding 26, the low impedance coil 92 of pulse transformer 94, the master SCR 84, the negative terminal of battery 38, the diode 82', and the output terminal b of winding 28. On the same half cycle, as master SCR 84 turns on, the slave SCR 102 fires to place a low impedance path across windings 26 and 28, as connected in series by conductor 68, through the output terminal a of winding 26, the diode 76, the slave SCR 102, and the output terminal b of winding 28. Also, when the slave SCR 102 fires, a low impedance path is placed across winding 28 through output terminal a of winding 28, diode 76', slave SCR 102 and the output terminal b of winding 28. Furthermore, the battery 38 is discharged through the windings 26 and 28, as connected in series by conductor 68. The discharge path of the battery 38 is through the slave SCR 102, terminal b of winding 28, winding 28, conductor 68, winding 26, terminal a of winding 26, low impedance coil 92 of pulse transformer 94, and master SCR 84. This discharge of the battery 38 through the windings 26 and 28 further cooperatively aids regulation of the output of the alternator 10.

It is also possible to operate the regulator circuit 100 in a second manner by winding the pulse transformer 94 so that a positive pulse is provided to the gate of the slave SCR 102 when the master SCR 84 fires, as opposed to the previously described arrangement, whereby the positive pulse is provided to the gate of the slave SCR 102 when the master SCR 84 turns on. In this latter arrangement, the master SCR will function as previously described to place a low impedance shunt path across the winding 26 individually and the windings 26 and 28 as connected in series by conductor 68.

However, on the opposite half cycle, when slave SCR 102 conducts, the battery 38 is placed in opposition to series connection of the windings 26 and 28. More particularly, on the opposite half cycle, positive potential of the battery 38 will be connected to output terminal b of winding 28. The negative terminal of battery 38 will be held approximately at the potential of output terminal a of winding 26 by diode 80. Consequently, the battery 38 will provide an opposing potential which opposes the increase in positive potential at output terminal b of the winding 28 to regulate the alternator 10 on the opposite half cycle.

In the various regulation schemes of FIGS. 2-4, it has been determined through experimentation that the regulating current through the switching elements 52, 54, 84, 86, and 102 is much lower than the currents which would have been expected through the switching elements of conventional shunt regulators. For example, regulating currents in the neighborhood of one-half of the expected regulating currents have been measured. The reduction in regulating current through the switching elements of the regulators is believed to be attributed to the interaction and cooperation of the various regulating modes as disclosed herein. By virtue of the regulating schemes of this invention, the costs of the SCR switching elements of the regulators is substantially reduced since the current rating requirements are reduced. Additionally, the cost of the alternator is reduced since regulating windings are not used, and still furthermore, the alternators are more compact than alternators which use regulating windings.

Figure 5:
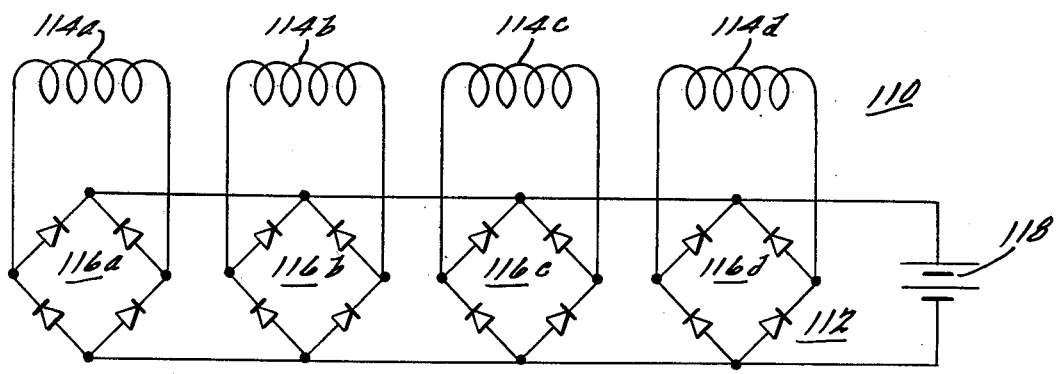
FIG. 5 is another embodiment of an alternator according to the present invention.

In FIG. 5, another embodiment of an alternator 110 and rectifier 112 is illustrated. Notice that the alternator 110 has four windings 114a–114d connected in parallel. For example, each of the four windings 114a–114d can be on three successive mutually-exclusive poles of a twelve pole alternator. Each winding 114a–114d is connected to a full wave rectifier 116a–116d, respectively. The outputs of the full wave rectifiers 116a–116d are connected in parallel to a battery 118. The alternator 110 and rectifier 112 combination can be combined with a regulating circuit as disclosed and taught with respect to FIGS. 2-4. Since four full wave rectifiers are used, i.e., one for each winding, the ratings of the diodes in the rectifiers can be much smaller than the ratings of the diodes of a single full wave rectifier used for all of the windings. It has been found that four such rectifiers with low-rated diodes are often less expensive than one rectifier with high-rated diodes. Accordingly, the alternator 110 and rectifier 112 configuration of FIG. 5 provides some economy in part costs.

Figure 6:
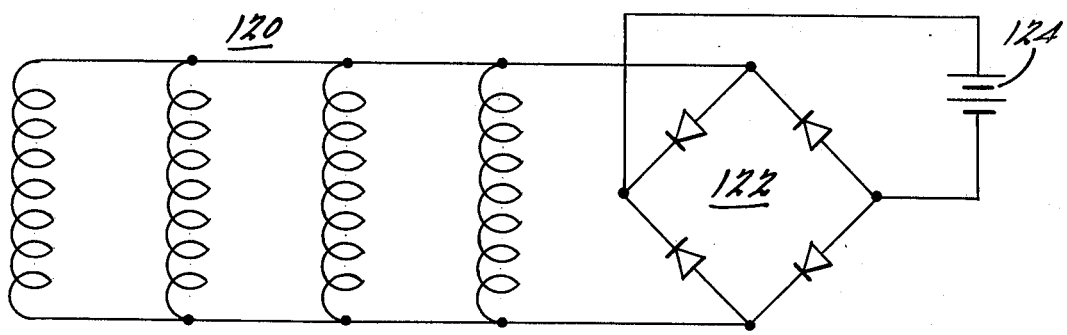
FIG. 6 is yet another embodiment of an alternator according to the present invention.

In FIG. 6, an alternator 120 is shown in combination with a full wave rectifier 122. The alternator 120 has four windings connected directly in parallel. The windings of alternator 120 may be wound on a twelve pole stator as described with respect to FIG. 5. In this case, a single full wave rectifier is connected to all four windings. In turn, the output of the full wave rectifier 122 is connected to a battery 124. The alternator 120 can be combined with a regulating circuit as taught with respect to FIG. 2.

Figure 7:
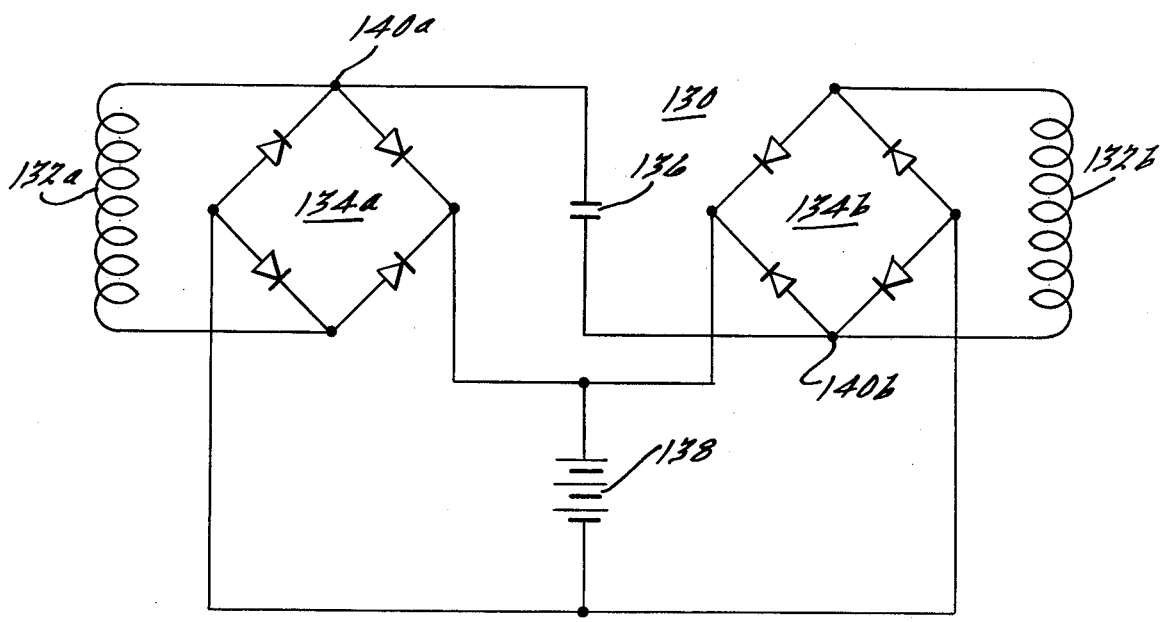
FIG. 7 is still another embodiment of an alternator according to the present invention.

In FIG. 7, a resonant alternator 130 according to the present invention is illustrated. The resonant alternator 130 includes a pair of windings 132a and 132b, a pair of associated full wave rectifiers 134a and 134b, respectively, and a capacitor 136. The outputs of full wave rectifiers 134a and 134b are connected to a battery 138. A winding terminal 140a of winding 132a and a winding terminal 140b of winding 132b are connected via a capacitor 136 so as to establish a resonant circuit between the winding 132a, the winding 132b, and the capacitor 136. Preferably, winding terminal 140a is out of phase with terminal 140b. The resonant effect provided by the addition of capacitor 136 provides enhanced low RPM output of the alternator 130. The capacitor 136 also tends to diminish the output of the alternator 130 at higher RPMs so as to provide a degree of self-regulation of the alternator 130. The alternator 130 can be combined with a regulator as taught with respect to FIGS. 2-4.

As a further modification, it has been found that the capacitor 136 can be eliminated, resulting in a direct connection between terminals 140a and 140b. In this modification, the resonant effect is not present. The current outputs of windings 132a and 132b are additive and provide an even more pronounced increase in output at low alternator speeds.

It is to be understood that the foregoing description is that of preferred embodiments of the invention. Various changes and modifications may be made without departing from the spirit and scope of the invention as defined by the appended claims.

What is claimed is:

1. For a permanent magnet alternator having a rotor with a plurality of permanent magnet poles for providing a magnetic field, a stator with a plurality of poles cooperating with said plurality of permanent magnet poles, and winding means for said stator comprising at least two sets of windings connected in parallel so that the rotation of said rotor relative to said stator provides a magnetic field-induced current in each of said sets of windings, and utilization means connected to said windings for receiving the additive output current of said sets of windings, a regulating circuit comprising:

detecting means for detecting a predetermined electrical condition; and circuit means including controlled conduction means associated with said detecting means for conducting in response to said predetermined electrical condition, said circuit means further including connecting means connected to said controlled conduction means and connecting said sets of windings in series so that said controlled conduction means connects a shunting path across the series connection of said sets of windings provided by said connecting means upon conduction of said controlled conduction means and so that the current through said shunting path is less than said additive output current of said sets of windings received by said utilization means.

2. A regulating circuit according to claim 1 wherein each of said sets of windings have a pair of output conductors and wherein said controlled conduction means includes a controlled conduction device for each of said windings, said controlled conduction devices being connected in series and said windings also being connected in series, said series connection of said windings being connected in parallel with said series connection of said controlled conduction devices whereby upon conduction of said controlled conduction devices in response to said predetermined electrical condition, said controlled conduction devices provide a shunting path for said series connection of said windings.

3. A regulating circuit according to claim 1 wherein said winding means consists of two sets of windings, each of said sets of windings have a pair of output conductors and said controlled conduction means includes a first controlled conduction device and a second controlled conduction device each having a pair of terminals for conduction therebetween upon conduction thereof, said first controlled conduction device being connected at the one terminal to one output conductor of one of said windings and being connected at the other terminal to the other controlled conduction device at its one terminal, said second controlled conduction device being connected at the other terminal to one output conduction of the other of said sets of windings, the other output conductors of said sets of windings being connected in series whereby said sets of windings and said controlled conduction devices are respectively connected in series and each of said respective series connection of said sets of windings and said controlled conduction devices are connected in parallel with the other.

4. A regulating circuit according to claim 3 wherein one of said first and second controlled conduction means is connected to said detecting means for conducting in response to said predetermined electrical condition and further including means responsive to the conduction of said one of said first and second controlled conduction means to control the conduction of the other of said first and second controlled conduction means whereby each of said first and second controlled conduction means is responsive to said detecting means.

5. For a permanent magnet alternator having a rotor with a plurality of permanent magnet poles for providing a magnetic field, a stator with a plurality of poles cooperating with said plurality of permanent magnet poles, and winding means for said stator comprising at least two sets of windings connected in parallel so that the rotation of said rotor relative to said stator provides a magnetic field-induced current in each of said sets of windings, and a battery connected to said windings for receiving the additive output current of said sets of windings, a regulating circuit comprising:
   detecting means for responding to the attainment of a predetermined level of charge of said battery; and
   circuit means including controlled conduction means associated with said detecting means for conducting in response to said predetermined level of charge of said battery, said circuit means further including connecting means connected to said controlled conduction means and connecting said sets of windings in series so that said controlled conduction means connects a shunting path across the series connection of said sets of windings provided by said connecting means upon conduction of said controlled conduction means and so that the current through said shunting path is less than said additive output current of said sets of windings received by said utilization means.

6. A regulating circuit according to claim 5 wherein each of said sets of windings having a pair of output conductors and wherein said controlled conduction means includes a controlled conduction device for each of said windings, said controlled conduction devices being connected in series and said windings also being connected in series, said series connection of said windings being connected in parallel with said series connection of said controlled conduction devices whereby upon conduction of said controlled conduction devices in response to the attainment of said predetermined level of charge of said battery, said controlled conduction devices provide a shunting path for said series connection of said windings.

7. A regulating circuit according to claim 5 wherein said winding means consists of two sets of windings, each of said sets of windings have a pair of output conductors and said controlled conduction means includes a first controlled conduction device and a second controlled conduction device each having a pair of terminals for conduction therebetween upon conduction thereof, said first controlled conduction device being connected at the one terminal to one output conductor of one of said windings and being connected at the other terminal to the other controlled conduction device at its one terminal, said second controlled conduction device being connected at the other terminal to one output conduction of the other of said sets of windings, the other output conductors of said sets of windings being connected in series whereby said sets of windings and said controlled conduction devices are respectively connected in series and each of said respective series connection of said sets of windings and said controlled conduction devices are connected in parallel with the other.

8. A regulating circuit according to claim 7 wherein one of said first and second controlled conduction means is connected to said detecting means for conducting in response to said predetermined electrical condition and further including means responsive to the conduction of said one of said first and second controlled conduction means to control the conduction of the other of said first and second controlled conduction means whereby each of said first and second controlled conduction means is responsive to said detecting means.

9. A regulating circuit according to claim 5 including a rectifier for each set of windings having an input and an output, and wherein each of said sets of windings are connected to the inputs of respective rectifiers, and the output of said rectifiers are connected in parallel to said battery whereby said sets of windings are connected in parallel to said battery.

* * * * *